(12) United States Patent
Schmidt et al.

(10) Patent No.: US 9,058,906 B2
(45) Date of Patent: Jun. 16, 2015

(54) FUEL ELEMENT STORAGE AND COOLING CONFIGURATION

(75) Inventors: Marcel Schmidt, Düsseldorf (DE);
Daniel Freis, Mannheim (DE); Norbert Haspel, Lorsch (DE)

(73) Assignee: Westinghouse Electric Germany GmbH, Mannheim (DE)

( * ) Notice: Subject to any disclaimer, the term of this patent is extended or adjusted under 35 U.S.C. 154(b) by 744 days.

(21) Appl. No.: 13/222,346

(22) Filed: Aug. 31, 2011

(65) Prior Publication Data
US 2012/0051484 A1    Mar. 1, 2012

(30) Foreign Application Priority Data

Aug. 31, 2010   (DE) .......................... 10 2010 035 955

(51) Int. Cl.
| | | |
|---|---|---|
| *G21C 13/00* | (2006.01) | |
| *G21C 19/07* | (2006.01) | |
| *G21C 19/08* | (2006.01) | |
| *G21C 19/40* | (2006.01) | |
| *G21C 15/00* | (2006.01) | |

(52) U.S. Cl.
CPC ................ *G21C 19/07* (2013.01); *G21C 15/00* (2013.01); *G21C 19/08* (2013.01); *G21C 19/40* (2013.01)

(58) Field of Classification Search
CPC ........ G21C 15/00; G21C 19/00; G21C 19/07; G21C 19/08
USPC ........................................................ 376/273
See application file for complete search history.

(56) References Cited

U.S. PATENT DOCUMENTS

| | | | |
|---|---|---|---|
| 4,404,165 A | | 9/1983 | Hesky et al. |
| 4,587,079 A | * | 5/1986 | Fajeau et al. .................. 376/282 |
| 4,786,492 A | * | 11/1988 | Ratcliff ........................... 424/53 |
| 5,263,067 A | * | 11/1993 | Ekeroth et al. ................ 376/298 |
| 2008/0095295 A1 | | 4/2008 | Fuls |

FOREIGN PATENT DOCUMENTS

| | | | |
|---|---|---|---|
| DE | 2944962 A1 | | 5/1981 |
| DE | 3014289 A1 | | 10/1981 |
| DE | 3130109 | * | 2/1983 |
| DE | 3130109 A1 | | 2/1983 |
| DE | 10217969 A1 | | 11/2003 |
| JP | 02-176596 | * | 7/1990 |

* cited by examiner

*Primary Examiner* — Frank J McGue
(74) *Attorney, Agent, or Firm* — Laurence A. Greenberg; Werner H. Stemer; Ralph E. Locher

(57) ABSTRACT

A fuel element storage and cooling configuration includes a fuel element storage pool and a cooling system having at least one first heat exchanger disposed in the fuel element storage pool and at least one second heat exchanger disposed in a heat sink and located at a distance therefrom, above a highest point of the first heat exchanger. The two heat exchangers are connected, using a pipe system, to form a closed circuit, which is at least partially filled with a flowable coolant. If the temperature of the first heat exchanger is increased with respect to the second heat exchanger, natural circulation of the coolant, and thus heat transport from the fuel element storage pool to the heat sink, is ensured without a pump apparatus.

9 Claims, 3 Drawing Sheets

FUEL ELEMENT STORAGE AND COOLING CONFIGURATION

CROSS-REFERENCE TO RELATED APPLICATION

This application claims the priority, under 35 U.S.C. §119, of German Patent Application DE 10 2010 035 955.6, filed Aug. 31, 2010; the prior application is herewith incorporated by reference in its entirety.

BACKGROUND OF THE INVENTION

Field of the Invention

The invention relates to a fuel element storage and cooling configuration including a fuel element storage pool and a cooling system. It is generally known that preferably uranium-containing fuel elements are used as nuclear fuel in nuclear power generation plants. Those fuel elements have a mostly rod-like shape, depending on the type of reactor, with a typical pressurized-water reactor of 1200 MW output requiring approximately 190 such fuel elements for one core load. Each year, approximately 20% of all of the fuel elements must be replaced by new ones after their respective burnup, depending on the usage type of the nuclear reactor.

For that purpose, the respective fuel elements are removed from the reactor core, which is disposed inside a reactor containment, by way of a corresponding robot-type apparatus and transferred to a neighboring fuel element storage pool, also known as a spent fuel pool, which is likewise located in the reactor containment, and temporarily stored there. Even if the fuel elements are burnt up in such a way that they can no longer be used in a reactor, they still initially have a not inconsiderable decay power that is associated with a corresponding heat generation, which certainly falls within the MW range.

In order to protect the operating staff and the environment against radioactivity that occurs during that process, and at the same time to ensure heat dissipation of the temporarily stored fuel elements, the fuel element storage pool, or the spent fuel pool, is filled with pure water in such a way that the actual fuel element storage location at the bottom of the spent fuel pool is surrounded to the sides and toward the top by several meters of water.

For the purpose of maintaining the reactor, the entire core load of fuel elements is temporarily stored in the spent fuel pool, if so required, in such a way that access to the reactor core is ensured. Depending on the storage levels, thermal outputs of 10 MW and more occur in the spent fuel pool, which could bring the water therein to the boil within a matter of a few hours. However, that must be prevented for reasons of safety under all circumstances.

Therefore, spent fuel pools have cooling systems which guide the generated thermal output, using heat exchangers, to a heat sink, that is to say to a region or a device that can absorb heat.

According to the prior art, cooling systems for spent fuel pools in the reactor sector are realized without exception by way of using active components, especially pumps. The use of active components allows the efficiency of a heat exchanger, which is likewise a conventional measure for this purpose, to be increased in an advantageous manner, but the disadvantage is that if the active components fail, the spent fuel pool can possibly overheat over a time period in the hour range.

Even if correspondingly frequent maintenance and the provision of corresponding emergency power systems nearly rule out the likelihood of such an event occurring, it is desirable, due to the extremely high safety demands in the reactor sector, to further increase the reliability of cooling systems in spent fuel pools, particularly under extreme conditions.

SUMMARY OF THE INVENTION

It is accordingly an object of the invention to provide a fuel element storage and cooling configuration, which overcomes the hereinafore-mentioned disadvantages of the heretofore-known devices of this general type and which makes an improved cooling system available for spent fuel pools.

With the foregoing and other objects in view there is provided, in accordance with the invention, a fuel element storage and cooling configuration, comprising a fuel element storage pool, a heat sink, a cooling system including at least one first heat exchanger disposed in the fuel element storage pool and having a highest point and at least one second heat exchanger disposed in the heat sink at a distance from the at least one first heat exchanger above the highest point of the at least one first heat exchanger, and a pipe system at least partially filled with a flowable coolant and interconnecting the at least one first and the at least one second heat exchangers to form a closed circuit. The pipe system ensures natural circulation of the coolant and thus heat transport from the fuel element storage pool to the heat sink, without a pump apparatus, upon a temperature increase of the at least one first heat exchanger relative to the at least one second heat exchanger.

The core concept of the invention is to completely dispense with active components in the cooling system and to thus further reduce the likelihood of their failure. A typical active component is a pump which, for example, pumps a coolant in an intermediate circuit between two heat exchangers. Such intermediate circuits are advantageous in nuclear facilities for reasons of safety in order to prevent contaminated water from leaking out of the fuel element storage pool into the environment under all circumstances.

Specifically, the height difference between the first and the second heat exchanger makes it possible to achieve so-called natural circulation of the flowable coolant. The coolant, which is preferably introduced into the first heat exchanger from below, has a lower temperature than the heat exchanger and heats up as it flows through the internal heat-exchanger pipes thereof, that is to say it takes on at most the temperature of the water surrounding the first heat exchanger. In the process, the coolant expands in such a way that it becomes less dense, that is to say it is lighter per unit volume than the following, colder coolant.

The outlet for the outflow of the coolant from the first heat exchanger is provided in the upper region thereof in such a way that the coolant with the higher specific density which follows pushes the heated coolant with lower specific density upward. Disposed above the first heat exchanger is the second heat exchanger which cools the coolant in such a way that it flows downward again in the circuit, with correspondingly higher specific density, to the first heat exchanger.

In order to achieve a desired cooling output, the diameter of the pipes and possibly the contact area of the heat exchangers can be increased, if appropriate. This possibly increased outlay in terms of construction is, however, justified due to an increased measure of safety. Thus, a cooling system is provided for dissipating heat from the spent fuel pool, which advantageously dispenses with any active components.

However, the invention is not at all restricted to a purely liquid coolant. In accordance with another feature of the invention, the at least one first heat exchanger is configured as an evaporator and the at least one second heat exchanger is configured as a condenser.

The coolant should be selected in terms of its boiling and condensation points under the given pressure and temperature conditions, in such a way that, if it is introduced as a liquid into the first heat exchanger, or evaporator, it evaporates there and has a considerably higher cooling effect due to the evaporation energy required. The now gaseous coolant then flows likewise in the direction of the second heat exchanger, or condenser, which is situated at a higher location. In this case, the coolant reverts to the liquid state while giving off thermal energy and can be guided through the circuit under the force of gravity, into the evaporator, without the use of a pump. The cooling output of the fuel element storage pool and cooling system according to the invention is thus increased in an advantageous manner.

In accordance with a further feature of the invention, the flowable coolant is a refrigerant. Like coolants, refrigerants transport enthalpy. The difference is that a refrigerant can do so even against a temperature gradient in such a way that the ambient temperature can even be higher than the temperature of the object to be cooled. In contrast thereto, a coolant can only transport the enthalpy along the temperature gradient to a place of lower temperature. According to the invention, refrigerants that have proven suitable for this purpose are, for example, the group of refrigerants having two carbon atoms, which is known under the designation R1xx, with xx being a placeholder for the numbering of the various variants, as is known to a person skilled in the art, however. The refrigerant R134a with the chemical formula $C_2H_2F_4$ has proven particularly suitable. In this way, the cooling output is increased once again.

In accordance with an added feature of the invention, the at least one first heat exchanger is disposed in such a way that it is suspended, for example through the use of a suitable holding apparatus at the pool edge. In this way, the flow can pass more easily through the now vertical cooling pipes in an advantageous manner. It must be ensured that the first heat exchanger during operation of the spent fuel pool is located completely below the surface of the now necessary water filling in order to ensure maximum heat exchange. The two necessary feed pipelines can likewise be guided to the heat exchanger from above over the pool edge, in such a way that there is no need for a through-hole in the pool wall. In this way, very simple installation of a cooling system, which can if appropriate also be retrofitted without a great amount of outlay, is ensured.

In accordance with an additional feature of the invention, it proves advantageous to place a baffle on an outer face of the at least one first heat exchanger. This baffle should be configured in such a way that the water heated by the heat generated by the stored fuel elements, which water rises up from the fuel element storage site for temperature reasons, is guided in the direction of the first heat exchanger in order to enable an improved heat exchange.

In accordance with yet another feature of the invention, in a particularly preferred configuration, the second heat exchanger is disposed 3 m-5 m above the highest point of the first heat exchanger. Such a height difference proves particularly suitable for building up so much pressure of the condensed or cooled coolant, under the force of gravity, that it flows from the second heat exchanger back into the first heat exchanger even over a relatively long horizontal distance, for example a few tens of meters or even 100 m. Such a distance results, for example, from the distance from the spent fuel pool to the cooling tower. The pipelines between the first and the second heat exchanger, and in particular the return line for the cooled or condensed coolant, should preferably be configured to have a continuous slope. This ensures a barrier-free natural circulation of the coolant.

In accordance with yet a further feature of the invention, closure devices, which are activated in the event of a sudden pressure drop and stop circulation of the coolant, are provided in a point-by-point manner inside the closed circuit. This is intended to ensure that, in the event of a leak in the cooling circuit, no contaminated water passes from the spent fuel pool through the heat exchanger into the cooling circuit or from there into the environment.

In accordance with yet an added feature of the invention, in a particularly preferred invention variant, a natural draft dry cooling tower is used as the heat sink. This is because a natural draft dry tower brings about forced cooling of the second heat exchanger likewise without active components, which should be avoided according to the invention.

In accordance with yet an additional feature of the invention, a plurality of cooling systems, which are independent from one another at least with respect to the circuit, is provided. The use of a plurality of similar cooling systems, which summarily make available a desired cooling output, reduces the consequences of the failure of a system in an advantageous manner. In order to ensure the independence of the systems, at least the cooling circuits must be configured independently of one another in order to continue to be operational at least with reduced cooling output in the event of a leakage in a cooling circuit. Placing a plurality of second heat exchangers or condensers in the same cooling tower, however, is acceptable since the likelihood of a cooling tower failing, even measured against the most stringent safety requirements in the nuclear engineering sector, is particularly low.

In accordance with again another feature of the invention, in order to increase the operational reliability further, it is expedient to configure the cooling systems in an overredundant manner, that is to say to summarily make available more than the maximum needed cooling output, wherein the output reserve includes at least the individual output of the most efficient individual cooling system. More preferably, the cooling systems should be of identical configuration, wherein overall the failure of two individual cooling systems can be compensated for.

Another possibility for increasing the operational reliability is to configure the cooling systems in a diverse manner. In this case, an output excess with respect to the intended maximum cooling output is likewise made available, but the various cooling systems operate according to different cooling principles. It is thus possible to provide, for example, some of the required cooling output by way of active cooling systems, which the invention actually tries to avoid, where another part of the cooling output is made available by way of passive cooling systems according to the invention. Due to the different nature of the types of cooling, increased reliability is ensured, at least for some of the maximum cooling output.

In accordance with a concomitant feature of the invention, the cooling system is configured for a cooling output of 5 MW-30 MW. This corresponds to the cooling output to be intended for the spent fuel pool of a typical reactor in the output range of 600 MW to 1500 MW.

Other features which are considered as characteristic for the invention are set forth in the appended claims, noting that further advantageous possible embodiments can be gathered from the further dependent claims.

Although the invention is illustrated and described herein as embodied in a fuel element storage pool with a cooling system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
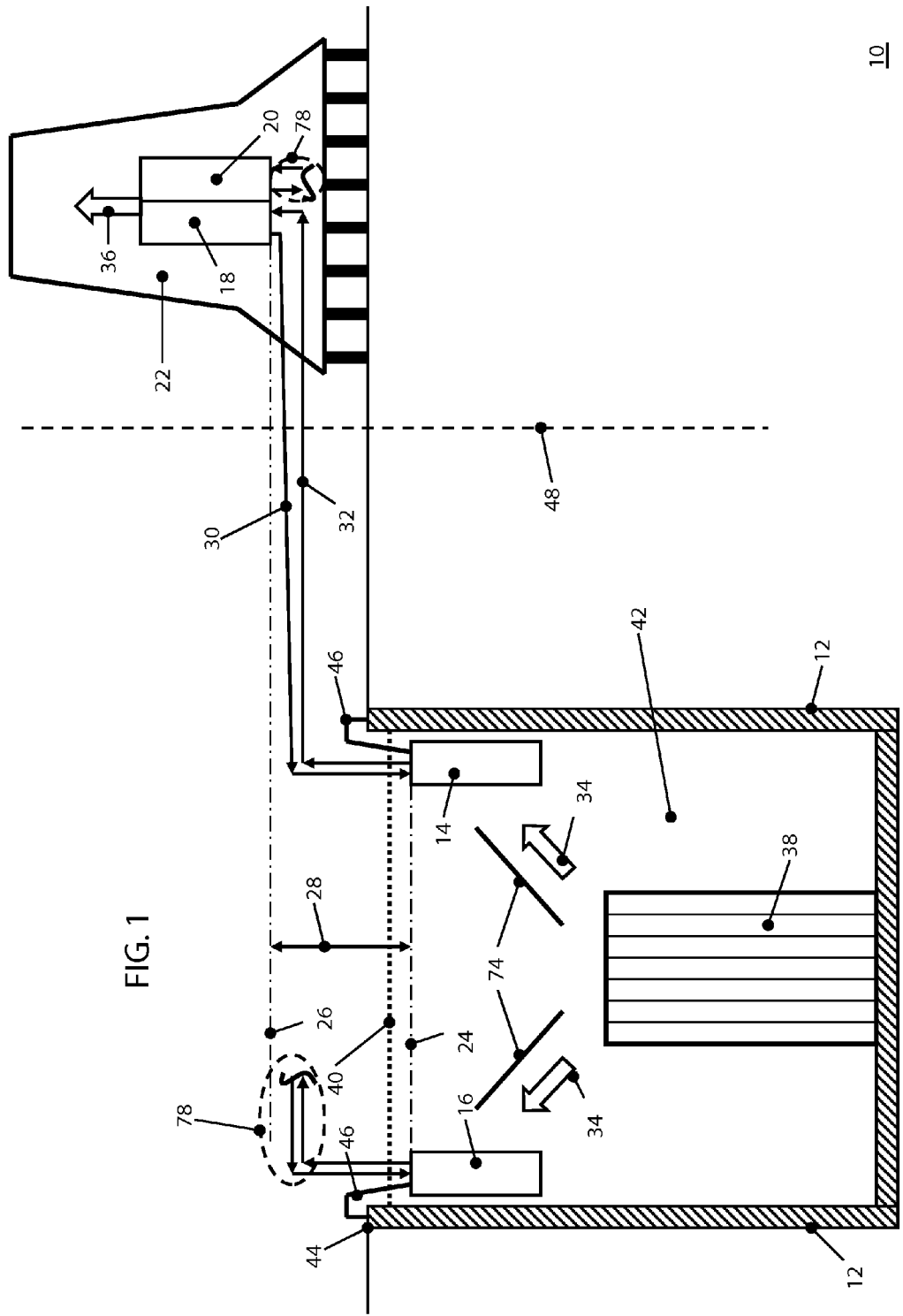
FIG. 1 is a diagrammatic, cross-sectional view of an example of a fuel element storage pool with a cooling system.

Referring now to the figures of the drawings in detail and first, particularly, to FIG. 1 thereof, there is seen an example of a configuration 10 having a fuel element storage pool 12 with a cooling system. A fuel element storage location 38 is centrally disposed at a pool bottom of the fuel element storage pool 12 which has, for example, a diameter of 10 m. The storage location 38 has a multiplicity of stack-like storage positions for rod-like fuel elements, for example several hundred thereof. The fuel element storage pool 12 is filled with water 42, having a fill level 40 which is just below a pool edge 44. Two first heat exchangers 14, 16, which are suspended and force-lockingly connected to the pool edge through the use of respective holding elements 46, are likewise disposed in the fuel element storage pool 12 below the fill level 40. A force-locking connection is one which connects two elements together by force external to the elements, as opposed to a form-locking connection which is provided by the shapes of the elements themselves. The highest point of the first heat exchangers 14, 16 is indicated by a reference line 24. This reference line 24 is a height reference point for second heat exchangers 18, 20 which are to be disposed at a higher location. In a real or actual configuration, however, a plurality of first heat exchangers must be provided, in particular for redundancy reasons.

The fuel elements (not shown in the figure) which are stored in the fuel element storage location 38 output a thermal output, for example 16 MW, into the water 42, which is indicated by an arrow 34 and is ultimately transferred into the first heat exchangers 14, 16 in the form of a thermal input. In this regard, two guiding plates or baffles 74, which may be disposed on or near an outer surface of the first heat exchangers 14, 16, are provided. Two pipeline parts 30, 32, which are necessary for forming a first cooling circuit, are indicated for the first heat exchanger 14. However, a cooling circuit must, of course, also be provided for each further heat exchanger in a preferably independent form, as is indicated by partially illustrated sections of pipelines 78 of a second cooling circuit. Thus, a first independent cooling system 14, 18, 30, 32 as well as a second independent cooling system 16, 20, 78, are provided. It is understood that several cooling systems may be provided in an over-redundant manner.

The pipeline parts 30, 32 are guided over the pool edge and connected to the first heat exchanger 14, so that a through-hole in the pool wall is advantageously avoided. The pipeline parts 30, 32 are guided, preferably with a continuous slope in the direction of the spent fuel pool 12, from the spent fuel pool 12 through a reactor containment wall 48, which surrounds a non-illustrated reactor and the spent fuel pool 12, to the outside into the center of a natural draft cooling tower 22 serving as a heat sink. This natural draft cooling tower 22 is disposed, for example, at a distance of 50 m from the spent fuel pool 12 (although this is not shown to scale). The two second heat exchangers 18, 20, which are preferably configured as condensers, are disposed in the cooling tower 22, and the height of the lower edge of the heat exchangers 18, 20 is indicated by reference numeral 26. There is a height difference, for example of 3 m-5 m, which is indicated by an arrow 28, between the upper edge 24 of the first heat exchangers 14, 16, which are preferably configured as evaporators, and the lower edge 26 of the heat exchangers 18, 20. Each condenser 18, 20 is to be configured as an independent condenser field with separate feed lines 30, 32, in order to form a plurality of mutually independent cooling circuits. These cooling circuits are filled with a coolant.

Due to the thermal input 34 into the evaporator 14, the coolant evaporates and is guided in the gaseous state through the second part 32 of the pipeline system to the first condenser 18, where it condenses. A thermal output 36, which is output in the process, is transferred to a heat sink, in this case the cooling tower 22. The condensed coolant is returned in a continuous slope, under the force of gravity, through the first part 30 of the pipeline system, to the evaporator 14, and the cooling circuit is thus closed.

Figure 2:
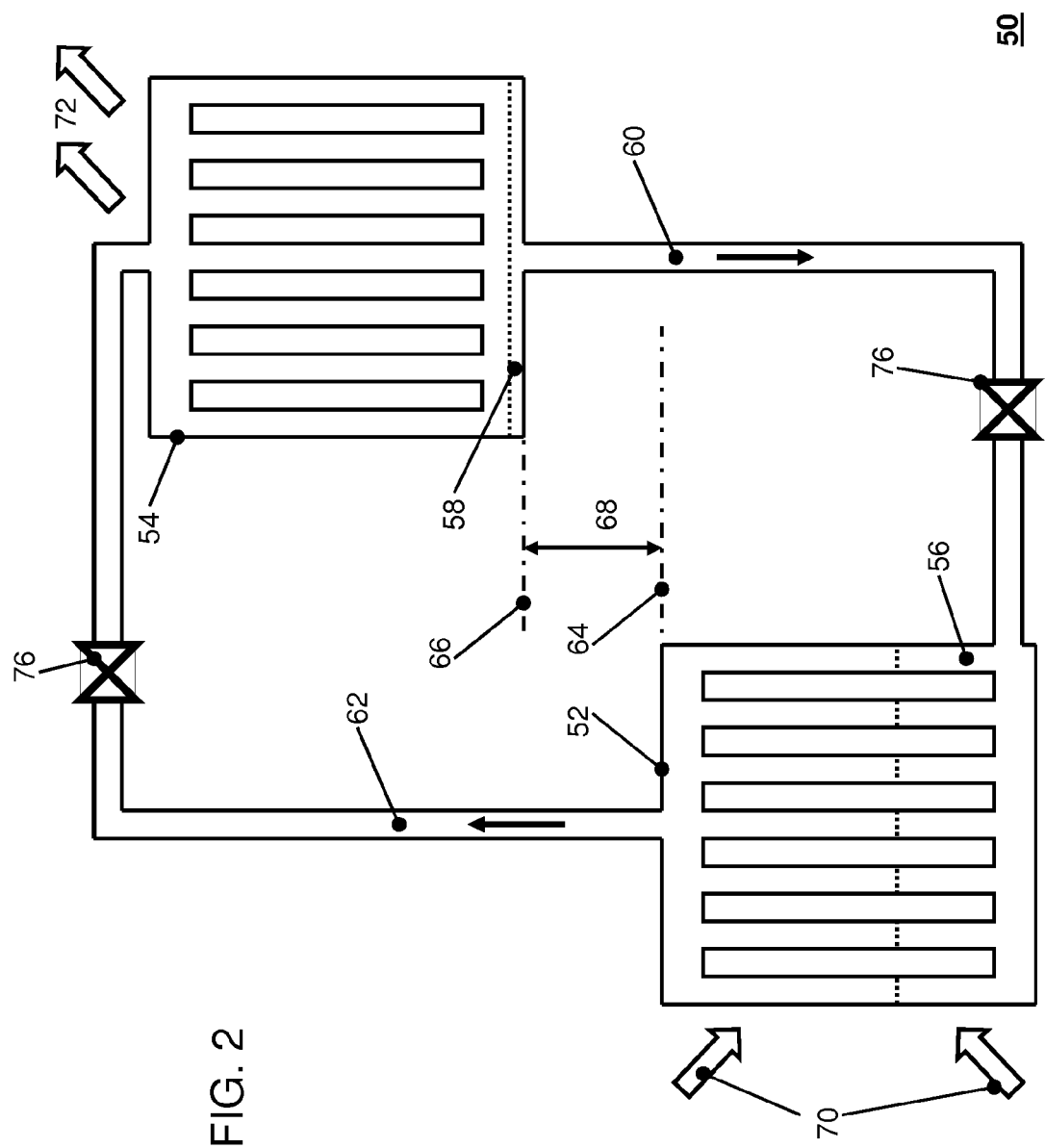
FIG. 2 is an elevational view of an exemplary passive circuit with a coolant.

FIG. 2 shows an exemplary circuit with a coolant 50. An evaporator 52 and a condenser 54 are connected through a first part 60 and a second part 62 of a pipeline system to form a closed cooling circuit. The evaporator 52 and the condenser 54 have a multiplicity of individual cooling pipes, which at their two ends are brought together in each case through a collecting connection to form a respective pipe connection. The multiplicity of individual cooling pipes serves to increase the contact area, thus resulting in an increased cooling output. The evaporator 52 is filled with a coolant 56 up to a height which is indicated by a dashed line. Due to a thermal input 70 into the evaporator 52, the coolant 56 evaporates with absorption of a thermal output and is guided in gaseous form through the pipeline part 62 to the condenser 54. In this case, the coolant condenses into a liquid state 58 while giving off a thermal output 72 and is returned to the evaporator through the pipeline part 60 under the force of gravity. The condenser 54 is disposed with its lowermost point 66 at a vertical distance 68 above an uppermost point 64 of the evaporator 52, in such a way that a natural circulation of the coolant 56, 58 is ensured, without the need for active components such as a pump. Valves or closure devices 76 are provided in a point-by-point manner inside the closed circuit 50. The closure devices 76 are activated in the event of a sudden pressure drop to stop circulation of the coolant 56, 58.

Figure 3:
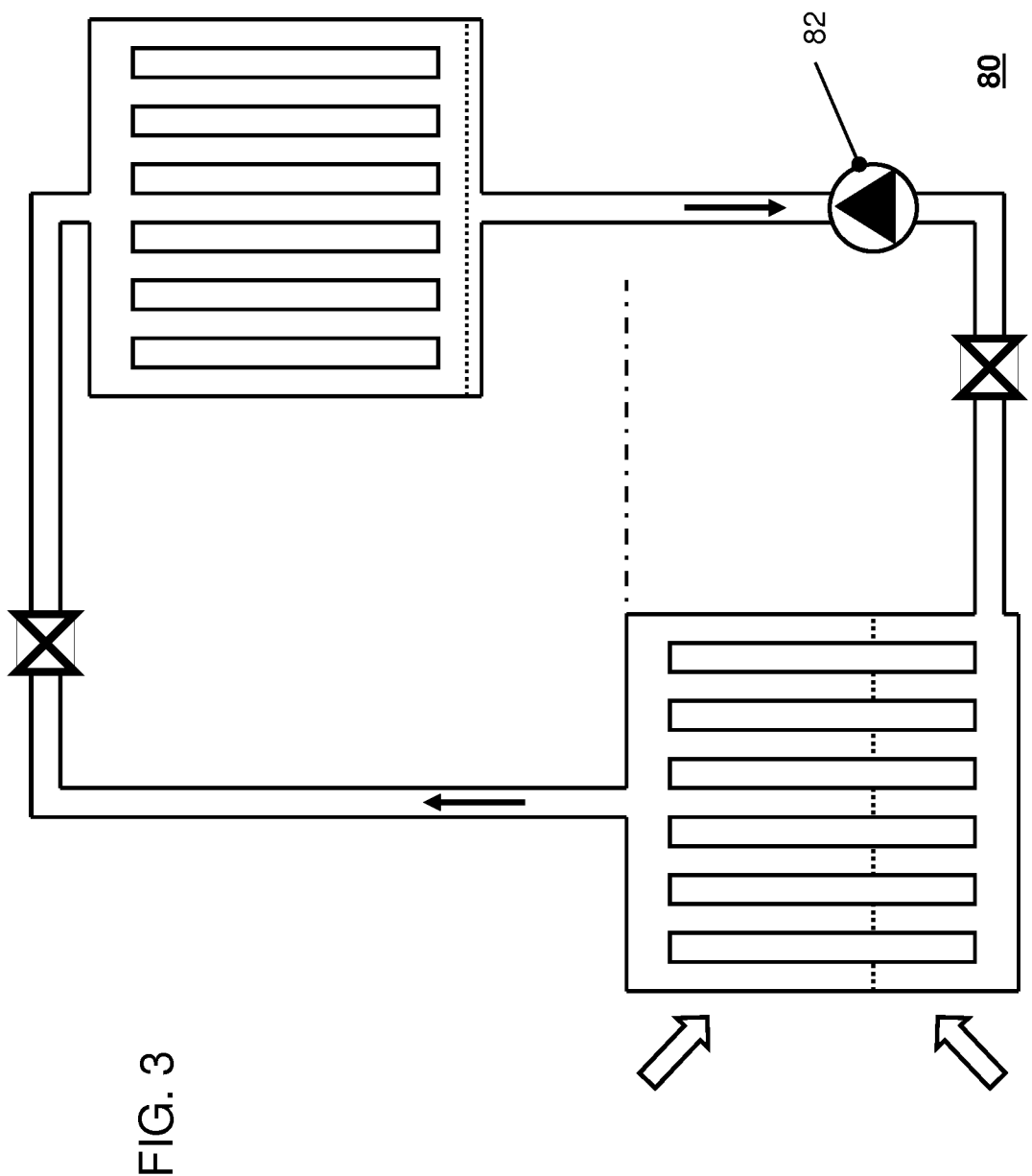
FIG. 3 is an elevational view of an exemplary active circuit with a coolant.

Whereas FIG. 2 shows only a passive cooling system, FIG. 3 shows an active cooling system which has a pump 82 for coolant 80 and can be provided in addition to the passive cooling system, thus providing diverse cooling systems.

The invention claimed is:

1. A fuel element storage and cooling configuration, comprising:
a fuel element storage pool;
a heat sink constructed as a natural draft dry cooling tower disposed at a horizontal distance of between 20 meters and 100 meters from said fuel element storage pool;

a cooling system including:
- at least one first heat exchanger configured as an evaporator, disposed in said fuel element storage pool and having a highest point, and
- at least one second heat exchanger configured as a condenser and disposed in said heat sink at a distance from said at least one first heat exchanger of 3 m-5 m above said highest point of said at least one first heat exchanger; and a pipe system at least partially filled with a flowable coolant and interconnecting said at least one first and said at least one second heat exchangers to form a closed circuit, said pipe system having a part forming a return line with a continuous slope for cooled or condensed coolant, and said pipe system ensuring natural circulation of the coolant and thus heat transport from said fuel element storage pool to said heat sink, without a pump apparatus, upon a temperature increase of said at least one first heat exchanger relative to said at least one second heat exchanger.

2. The fuel element storage and cooling configuration according to claim 1, wherein the flowable coolant is a refrigerant.

3. The fuel element storage and cooling configuration according to claim 1, wherein said at least one first heat exchanger is suspended.

4. The fuel element storage and cooling configuration according to claim 1, which further comprises a baffle disposed on an outer surface of said at least one first heat exchanger.

5. The fuel element storage and cooling configuration according to claim 1, which further comprises closure devices provided in a point-by-point manner inside said closed circuit, said closure devices being activated in the event of a sudden pressure drop to stop circulation of the coolant.

6. The fuel element storage and cooling configuration according to claim 1, wherein said cooling system is one of a plurality of cooling systems being independent of one another at least with respect to said closed circuit.

7. The fuel element storage and cooling configuration according to claim 6, wherein said cooling systems are configured in an overredundant manner.

8. The fuel element storage and cooling configuration according to claim 6, wherein said cooling systems are configured in a diverse manner.

9. The fuel element storage and cooling configuration according to claim 1, wherein said cooling system is configured for a cooling output of 5 MW-30 MW.

* * * * *